May 27, 1969 R. F. SEIWATZ 3,446,974

SOLID STATE ACOUSTIC SIGNAL TRANSLATING DEVICE WITH LIGHT ACTIVATED ELECTRODE INTERCONNECTIONS

Filed Nov. 7, 1966

Inventor
Ruth F. Seiwatz

By Hugh H. Drake
Attorney

United States Patent Office 3,446,974

Patented May 27, 1969

3,446,974

SOLID STATE ACOUSTIC SIGNAL TRANSLATING DEVICE WITH LIGHT ACTIVATED ELECTRODE INTERCONNECTIONS

Ruth F. Seiwatz, Oak Park, Ill., assignor to Zenith Radio Corporation, Chicago, Ill., a corporation of Delaware Filed Nov. 7, 1966, Ser. No. 592,564
Int. Cl. H01j 39/12
U.S. Cl. 250—211 10 Claims

ABSTRACT OF THE DISCLOSURE

A solid state acoustic signal translating device such as a surface wave acoustic filter is described, in which the input and output transducers each comprise a large number of surface electrodes extending transversely with respect to the direction of surface wave propagation. A pair of principal electrodes extending longitudinally in the direction of surface wave propagation are spaced from the opposite ends respectively of the transversely extending electrodes, and a photoconductive film contacts each of the principal electrodes and the transversely extending electrodes. An optical system is provided for illuminating selected portions of the photoconductive film to establish electrical connections between the principal electrodes and selected ones of the transversely extending electrodes to constitute a transducer electrode pattern whose frequency response is dependent on the particular ones of the transversely extending electrodes which are activated by the electrical connections. Means including an adjustable element in the optical system are provided for altering the locations of the illuminated portions of the photoconductive film to change the frequency response or tune the signal translating device.

This invention pertains to solid state circuitry. More specifically, it relates to an acousto-electric filter in which particular types of surface wave transducers are produced optically.

Previous methods used to generate and detect surface elastic waves piezoelectrically involve the mechanical coupling of a compressional or shear wave transducer to the body on which the surface waves propagate. It is now known that a transducer having an electrode array composed of interleaved combs of conductive teeth at alternating electric potentials, when coupled to one end portion of a piezoelectric medium, produces acoustic surface waves on the medium. In the simplified case of a ceramic poled perpendicularly to the surface, the waves travel at right angles to the teeth; in other cases, the waves may travel at an acute angle to the teeth, the particular angle in a given case being a function of crystallography of the material relative to the configuration of the array. The waves are converted back to an electrical signal by a similar array of conductive teeth coupled to the piezoelectric medium near its output end. In principle, the tooth pattern is analogous to an antenna array. Consequently, similar selectivity is possible, thereby eliminating the need for the critical or much larger and more cumbersome components normally associated with selective circuitry.

In many applications where tuning is required, for example in RF strips for television, it is highly desirable that such selective elements be themselves adjustable. That is, the center frequency of the filter should be adjustable. In the copending application of Robert Adler and Adrian De Vries, Ser. No. 592,565, filed Nov. 7, 1966, and assigned to the same assignee, tunability is provided by utilizing an optical system to project the desired transducer patterns. Specifically, a plurality of teeth-like areas are projected onto a photoconductively treated piezoelectric substrate to complete the formation of interleaved comb-shaped conductive elements.

In the comb pattern, signal current flows along the conductive teeth, and it is desired that the ratio of conductivities of the conducting portions, the teeth, and the nominally nonconducive portions, between the teeth, be quite high. Although the necessary conductivities and conductivity ratio are obtainable in known materials, there is a significant advantage in some cases in being able to choose the propagating material for its signal translating properties and to achieve the relative conductivities by other means.

It is, therefore, a general object of the present invention to provide improved transducers of a kind at least in part produced by optical projection techniques.

It is another object of the invention to reduce the requirement in such transducers on the ratio of the light to dark conductivities or on both the absolute value of light conductivity and the ratio of light to dark conductivity.

It is also an object of the present invention to minimize the conductance between electrodes while maximizing the conductance within a single electrode of a transducer array.

It is a more specific object of the present invention to provide an improved transducer device wherein the requisite conductivities are achieved independently of the propagating medium characteristics.

A solid state tunable acoustic filter constructed in accordance with the present invention comprises a piezoelectric substrate of a material such as PZT or quartz on which acoustic surface waves are propagated along one of its surfaces with a portion of that surface being light responsive and capable of conducting electrical current essentially only anisotropically, An optical system is positioned to project light upon the light responsive portions in patterns which serve as transducers. As used herein, the term "light" refers to radiation in both the visible and invisible portions of the spectrum.

The features of the present invention which are believed to be novel are set forth with particularity in the appending claims. The organization and manner of operation of the invention, together with further objects and advantages thereof, may best be understood by reference to the following description taken in connection with accompanying drawing, in the several figures with which like reference numerals identify like elements and in which:

Figure 1:
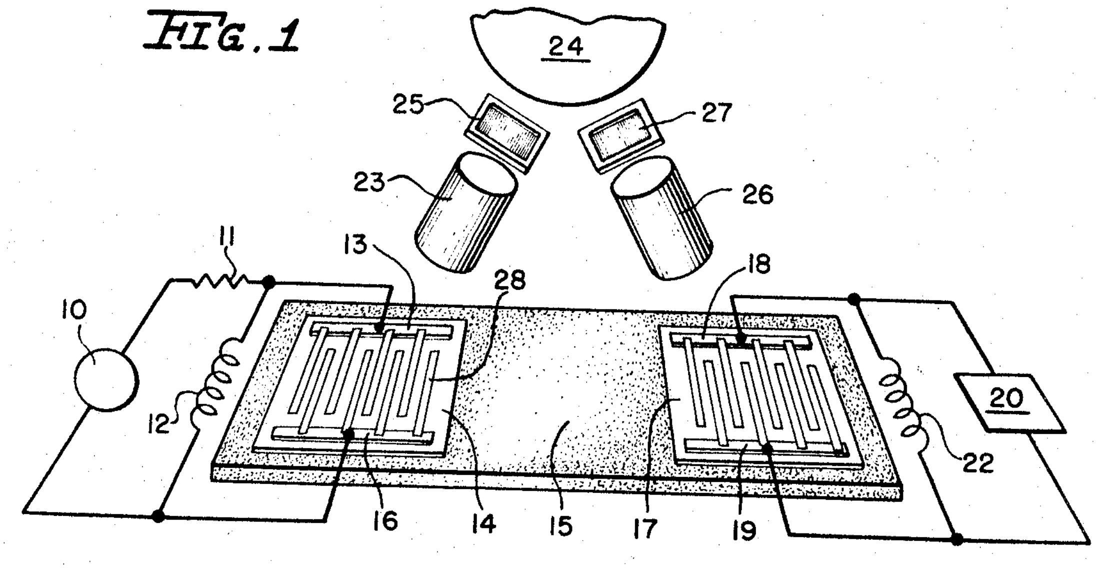
FIGURE 1 is a partly schematic plan view of an optical-acoustic filter.

FIGURE 1 depicts one embodiment of the apparatus described and claimed in the aforesaid Adler and De Vries application and is helpful here as background for an understanding of the present invention. A source 10 in series with a resistor 11 is connected between stripes 13 and 16 of conductive material. The stripes are coupled to the surface of a continuous photoconductive film 14 which is imprinted on one surface near one end of a substrate 15 of piezoelectric material. Stripes 13 and 16 are disposed parallel to the longitudinal edges of substrate 15. An inductor 12 is connected in parallel with the series connection of source 10 and resistor 11. Disposed on the same surface near the output end of substrate 15 is another film of continuous photoconductive material.

Imprinted upon film 17 are conductive stripes 18 and 19 which are also disposed parallel to the longtudinal edges of the substrate 15. A load 20, in parallel with an inductor 22, is connected between stripes 18 and 19. Inductors 12 and 22 are only optionally included, depending on the overall Q of the input and output networks. When used, they have a value to be resonant with the clamped capacitance of the transducers within the assigned signal frequency range.

A zoom lens system 23 focuses the image, produced when light from a source 24 is projected through a transparency pattern or mask 25, onto photoconductive film 14. Similarly, a zoom lens system 26 focuses the image produced, when light from source 24 is projected through a transparency pattern 27, onto photoconductive film 17.

The images defined by the patterns of transparencies 25 and 27 are always in focus upon films 14 and 17, respectively, even though the size of the image is changed by varying the distances between the lenses that make up the system. This, of course, is one of the basic features of the conventional zoom lens arrangement, as described and explained in the article by G. H. Cook, "Photographic Objectives," Applied Optics and Optical Engineering, vol. 3, R. Kingslake, ed. (Academic Press, New York, 1965), pp. 132–139.

The images projected from transparencies 25 and 27 upon the region including conductive stripes 13, 16, 18 and 19 are in the form of a plurality of teeth-like illuminated areas 28. Under illumination, these areas become conductive and together with the conductive stripes form interleaved conductive combs. That is, the transparency patterns define the comb teeth 28 and the outer end portions of adjacent ones of the teeth overlap opposite ones of the stripes.

In operation, direct piezoelectric surface wave transduction is accomplished by use of the spatially periodic optically-produced electrodes projected as teeth 28 on photoconductive film 14. A periodic electric field is produced by feeding a signal from source 10 across adjacent teeth, permitting piezoelectric coupling to a traveling surface wave. The electric fields between the projected teeth on the surface of film 14 extend between the conductive illuminated areas across the nonconductive unlit portions. The coupling occurs when the strain components produced by the electric fields in the piezoelectric substrate substantially match the strain components associated with the surface wave mode.

Source 10, for example a television receiver antenna, produces a range of signal frequencies. Due to the selective nature of the arrangement, essentially only a particular signal and its intelligence carrying sidebands are converted to a surface wave. The resulting surface wave is translated along substrate 15, imparted to the optically-produced electrodes projected on photoconductive film 17 and converted to an electrical output signal for application to load 20. It may be noted in passing that any difficulty with spurious response by virtue of coupling to reflected waves is reduced by affixing an acoustic absorber on the substrate beyond the output transducing region. For the same purpose, the end and side surfaces may be serrated to disperse any reflected waves.

The lens system maintains the focus of the image produced while the size of the image and therefore the spacing of the optical teeth of the combs is changed. This change in the spacing of the teeth alters the selectivity characteristic of the apparatus. More specifically, since the distance between the centers of two adjacent teeth is equal to one-half of the surface acoustic wavelength at the frequency which receives maximum transmission, a change in the size of the pattern alter the center frequency of the filter pass band.

Although the device has been described using interleaved combs with teeth disposed parallel to one another, the optical projection system is equally well suited for use with transparencies on which transducer configurations of other forms are defined. Such alternatives and other modifications are described in the Adler and De Vries application.

For best operation, it is preferred that transparencies 25 and 27 exhibit maximum opacity in defining the unlit areas and that the photoconductive films exhibit a maximum ratio of light to dark conductivity. In order to increase performance, the present invention contemplates that there be maximum conductivity along any one tooth while having nominal nonconductivity between adjacent teeth. To this end, the region upon which the optical combs are projected is rendered electrically anisotropic. More specifically, the comb region on the surface of substrate 15 is caused to be highly conductive, when lit, in a direction parallel to the teeth and essentially non-conductive in a direction perpendicular to the teeth.

Figure 2:
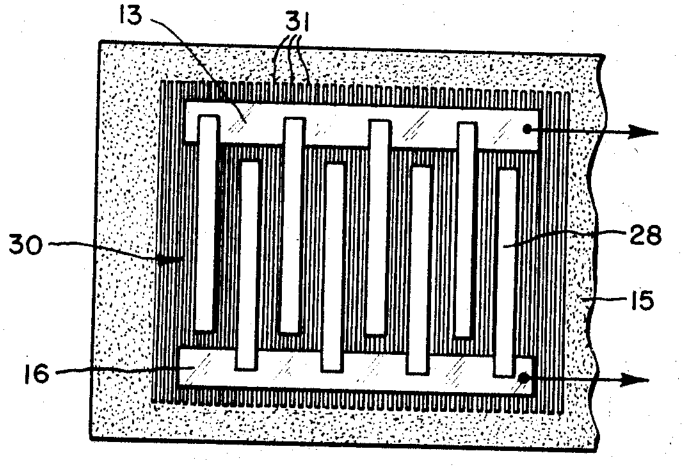
FIGURE 2 is an enlarged plan view of a portion of the device of FIGURE 1 modified in accordance with the invention.

FIGURE 2 depicts one embodiment of such an anisotropic photoconductive surface 30 imprinted or formed upon substrate 15. Only the input transducer portion is shown, since the output portion may be identical. Affixed on surface 30 and parallel to the longitudinal edges of substrate 15 are conductive stripes 13 and 16. Also as before, teeth 28 are projected to complete formation of the interleaved conductive combs. Photoconductive surface 30, however, is in this case composed of a plurality of thin ribbons 31 of photoconductive material running parallel to teeth 28. These ribbons, narrower and more closely spaced than the teeth of the combs by perhaps a factor of 10 or more, may be formed by first laying down a continuous film and then evaporating away parallel strips of the material. Such selective evaporation is achievable by irradiation with a laser beam which has been caused to form an interference pattern of the appropriate spacing. Such a method of engraving lines spaced as little as two microns apart on the surface of a germanium slab, by placing the slab on the focal plane of a lens illuminated by a ruby laser, is described in the article "Semiconductor Surface Damage Produced by Ruby Lasers," Milton Birnbaum, Journal of Applied Physics 36, 3688 (1965).

The overall operation of the FIGURE 2 device is substantially identical to that of the apparatus of FIGURE 1. The essential difference is that, while illumination of the surface with a tooth pattern takes place as before, conduction of electric current in the transducer is positively limited to the parallel ribbons of photoconductive material. There is no conduction between the ribbons. As a result, the transducer region is anisotropic with respect to the electric signal potential and the light to dark conductivity ratio is enhanced.

For clarity, stripes 13 and 16 have been shown as overlying ribbons 31. In this case, for best electrical conduction between the stripes and the teeth areas the stripes should be transparent to the illumination. It is preferred, however, to form stripes 13 and 16 directly on substrate 15 and then to form ribbons 31 as films sufficiently thin to be illuminated their entire depth.

Figure 3:
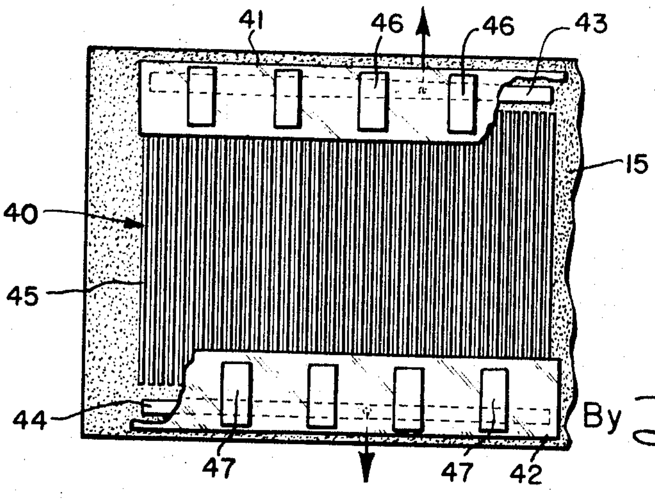
FIGURE 3 is another enlarged plan view depicting a different and improved modification of the device of FIGURE 1.

An alternative arrangement in which the comb region is electrically anisotropic is depicted in FIGURE 3. Transducing region 40 is composed of a series of ribbons 45 of conductive material coupled to the surface of substrate 15. These ribbons are disposed perpendicularly to the longitudinal edges of substrate 15 and individually connect spaced photoconductive stripes 41 and 42 which are disposed parallel to the longitudinal edges of the substrate. Running approximately the length of, and preferably beneath, stripes 41, 42 are respective conductive layers 43, 44 spaced from the ends of ribbons 45. The light patterns projected upon region 40 in this case include along each side edge a series of short bars 46, 47 spaced lengthwise along substrate 15 in a manner corresponding to teeth 28 of FIGURE 2. Here, however, each bar constitutes but a short part of the resulting "tooth" area, needing only to bridge layer 43 or 44 and the adjacent end portions of at least one and preferably several of ribbons 45. Thus, under illumination the resulting interleaved conductive combs are like those in FIGURE 2 but are composed respectively of layers 43, 44, bars 46, 47 and selected ones of ribbons 45. Again, there are perhaps ten or more of ribbons 45 under each illuminated bar 46, 47, although less are shown in the drawing for greater clarity. Conductive ribbons 45 may first be formed as a continuous film with strips then being removed as in the case of ribbons 31 in FIGURE 2 or they may be affixed directly by evaporation through a mask.

The width and spacing of light bars 46, 47 determine the number of ribbons in each comb tooth and the spacing between the teeth. By virtue of the use of conductive ribbons 45, electric signal current is conducted only along the teeth and the resistance between teeth is high. Consequently, the transducer region is rendered highly anisotropic. Transducer operation as such is essentially the same as in the case of FIGURE 2.

Alternatively in the FIGURE 3 configuration, the entire transducer region is coated with a photoconductive film, conductive ribbons 45 are affixed preferably under that, and the entire interleaved comb patterns are projected upon the region. At least a portion of conductive layers 43, 44 are deposited to serve as conductive connections for the external terminals. This simple addition of conductive ribbons 45 to the FIGURE 1 device, for example, substantially improves the conductivity ratio over that which is achieved with only a continuous photoconductive film.

Although the device has been described using the interleaved combs with teeth disposed parallel to one another, the techniques disclosed herein are equally well suited for transducer configurations of varied forms such as those as described in the copending application of De Vries, Ser. No. 582,387, filed Sept. 27, 1966 and assigned the same as the present application. Regardless of the particular effective electrode pattern, it is advantageous that the field-developing electrodes be highly conductive relative to the area between electrodes. Thus, the principle of rendering the transducing regions electrically anisotropic is applicable to any electrode configuration and is accomplished by shaping the conductive or photoconductive ribbons to conform to the shapes of the effective electrodes to be used.

While emphasis has been placed upon the provision of a selective device, it is to be noted that such optically projected transducers may also be utilized in conjunction with an amplifier by incorporating the principles disclosed in Adler application Ser. No. 499,936, filed Oct. 21, 1965, and assigned to the same assignee as the present application. Briefly, such amplification is obtained by means of traveling wave interaction between the surface waves induced in the piezoelectric material and charge carriers drifting in an associated semiconductive environment. Alternatively or in addition, the resulting transducer may be either an input or an output transducer or, as disclosed in the aforesaid De Vries application, may even be electrically unconnected to any source or load and instead so positioned relative to another transducer as to serve as a reflector or director of the propagating acoustic waves.

The disclosed apparatus affords new and improved selective circuitry useful in filters and discriminators which have substantial advantages over predecessor devices. The transducers are optically projected onto the signal translating medium, allowing optical tuning of the transducer to the requisite frequency. The entire selective film element is subject to fabrication in conjunction with integrated circuits. By using ribboned photoconductive or conductive surfaces in accordance with the teachings herein, the transducing region is rendered highly anisotropic to an electrical signal, providing desired ratios of electrode and non-electrode conductivities, all resulting in a highly efficient signal translating device.

While particular embodiments of the present invention have been shown and described, it will be obvious to those skilled in the art that changes and modifications may be made without departing from the invention in its broader aspects. Accordingly, the aim in the appending claims is to cover all such changes and modifications as fall within the true spirit and scope of the invention.

I claim:

1. An acoustic wave signal-translating device comprising:
- a substrate of wave propagating material;
- means including a source of radiation for projecting a pattern of individually illuminated areas upon a region on said substrate; and
- means including a film of an electrically anisotropic photoconductive material associated with said substrate for creating anisotropic electric conductivity in said region and responsive to the illumination of said areas for developing a configuration of conductive elements on said region, in which said photoconductive film is disposed over said region and is discontinuous, being divided into a series of ribbons oriented generally perpendicularly to the direction of fields developed between said conductive elements.

2. A device as defined in claim 1 in which the number of said ribbons is substantially greater than the number of said conductive elements developing said fields.

3. A device as defined in claim 1 in which spaced portions of conductive material are disposed across said series of ribbons.

4. An acoustic wave signal-translating device comprising:
- a substrate of wave propagating material;
- means including a source of radiation for projecting a pattern of individual illuminated areas upon a region on said substrate; and
- means including a photoconductor associated with said substrate for creating anisotropic electric conductivity in said region and responsive to the illumination of said areas for developing a configuration of conductive elements on said region, in which said region includes a series of ribbons of conductive material oriented generally perpendicularly to the direction of fields developed between said conductive elements and a film of photoconductive material disposed across a portion of said ribbons.

5. A device as defined in claim 4 in which said region further includes a layer of conductive material spaced from the ends of said ribbons, said film is disposed across at least portions of said layer and said ribbons and said pattern illuminates selected areas of said film with said areas bridging said layer and respective portions of said ribbons.

6. A device as defined in claim 5 in which said illuminated areas together with the ones of said ribbons bridged by said areas create a pattern of conductive elements in the form of interleaved combs.

7. A device as defined in claim 5 in which the spacing between said ribbons is substantially less than the length of said areas across said ribbons.

8. A solid state acoustic wave signal-translating device comprising:
- a piezoelectric substrate;
- a pair of principal fixed conductive electrodes on a major surface of said substrate, which electrodes extend longitudinally with respect to a predetermined direction of surface wave propagation;
- a plurality of additional fixed conductive electrodes spaced from said principal electrodes and extending transversely therebetween;
- photoconductive film means on said major surface in contact with said principal electrodes and said additional electrodes; and
- an optical system for illuminating selected portions of said photoconductive film means to establish electrical connections between said principal electrodes and selected ones of said additional electrodes.

9. A tunable solid state acoustic wave signal-translating device comprising:

a piezoelectric substrate;

a pair of principal fixed conductive electrodes on a major surface of said substrate, which electrodes extend longitudinally with respect to a predetermined direction of surface wave propagation;

a plurality of additional fixed conductive electrodes on said major surface spaced from said principal electrodes and extending transversely therebetween;

photoconductive film means on said major surface in contact with said principal electrodes and said additional electrodes;

an optical system for illuminating selected portions of said photoconductive film means to establish electrical connections between said principal electrodes and selected ones of said additional electrodes to complete a transducer electrode pattern whose frequency response is dependent upon the particular ones of said additional electrodes which are activated by said electrical connections; and means including an adjustable element in said optical system for altering the locations of said illuminated selected portions of said photoconductive film means to enable selection of different ones of said additional electrodes and change the frequency response of said signal-translating device.

10. A tunable solid state acoustic wave signal-translating device according to claim 9, in which said illuminated selected portions of said photoconductive film means individually overlap a plurality of said additional fixed conductive electrodes, and in which the spacing in a direction longitudinally with respect to said predetermined direction of surface wave propagation between said illuminated selected portions of said photoconductive film means is large relative to the spacings between individual adjacent pairs of said additional fixed conductive electrodes.

References Cited

UNITED STATES PATENTS

| | | | |
|---|---|---|---|
| 2,930,999 | 3/1960 | Van Santen et al. | 250—211 |
| 3,202,824 | 8/1965 | Yando | 250—211 |
| 3,202,827 | 8/1965 | Robinson | 250—211 |
| 3,360,749 | 12/1967 | Sittig | 333—72 |

RALPH G. NILSON, *Primary Examiner.*

B. L. ADAMS, *Assistant Examiner.*

U.S. Cl. X.R.

315—55; 333—72